(12) United States Patent
Minto et al.

(10) Patent No.: US 10,787,228 B2
(45) Date of Patent: Sep. 29, 2020

(54) PIN FOR A CROWN OF A BICYCLE CRANKSET

(71) Applicant: CAMPAGNOLO S.r.l., Vicenza (IT)

(72) Inventors: Marco Minto, Mirano (IT); Nicola Sgreva, Arcugnano (IT)

(73) Assignee: Campagnolo S.r.l., Vicenza (IT)

( * ) Notice: Subject to any disclaimer, the term of this patent is extended or adjusted under 35 U.S.C. 154(b) by 141 days.

(21) Appl. No.: 15/783,797

(22) Filed: Oct. 13, 2017

(65) Prior Publication Data

US 2018/0105228 A1   Apr. 19, 2018

(30) Foreign Application Priority Data

Oct. 17, 2016   (IT) .......................... 102016000103875

(51) Int. Cl.
  *B62M 9/12*       (2006.01)
  *B62M 9/10*       (2006.01)
  *F16H 55/30*      (2006.01)

(52) U.S. Cl.
  CPC ................ *B62M 9/12* (2013.01); *B62M 9/10* (2013.01); *B62M 9/105* (2013.01); *F16H 55/30* (2013.01)

(58) Field of Classification Search
  CPC ........... B62M 9/12; B62M 9/10; B62M 9/105
  USPC ........................................................ 474/160
  See application file for complete search history.

(56) References Cited

U.S. PATENT DOCUMENTS 5,192,248 A * 3/1993 Nagano .................... B62M 9/10
                                                    474/140
5,413,534 A * 5/1995 Nagano .................... B62M 9/10
                                                    474/160
5,458,543 A * 10/1995 Kobayashi ............... B62M 9/10
                                                    474/160
5,464,373 A * 11/1995 Leng ...................... B62M 9/105
                                                    474/140
5,876,296 A * 3/1999 Hsu ......................... B62M 9/10
                                                    474/140
5,971,878 A * 10/1999 Leng ....................... F16H 55/30
                                                    474/160
6,007,442 A * 12/1999 Schmidt ................... B62M 9/10
                                                    474/122

(Continued)

FOREIGN PATENT DOCUMENTS

CN          201971115 U         9/2011
CN          203716962 U         7/2014
CN          105971598 A         9/2016

OTHER PUBLICATIONS

Italian Search Report and Written Opinion in Italian Application No. 102016000103875, dated Jun. 8, 2017, with English translation.

(Continued)

*Primary Examiner* — Michael R Mansen
*Assistant Examiner* — Mark K Buse
(74) *Attorney, Agent, or Firm* — Volpe and Koenig, P.C.

(57) ABSTRACT

A pin for a crown of a bicycle crankset that includes a mounting portion configured to be fixed to the crown, a chain engaging portion having a first face that faces towards said mounting portion for engaging a plate of a link of a bicycle chain, and a second face that faces the opposite way with respect to said mounting portion. The second face has at least one first surface portion inclined by a first angle smaller than 90° when measured in a longitudinal section plane of the pin.

19 Claims, 13 Drawing Sheets

(56) References Cited

U.S. PATENT DOCUMENTS

Figures 1, 2:
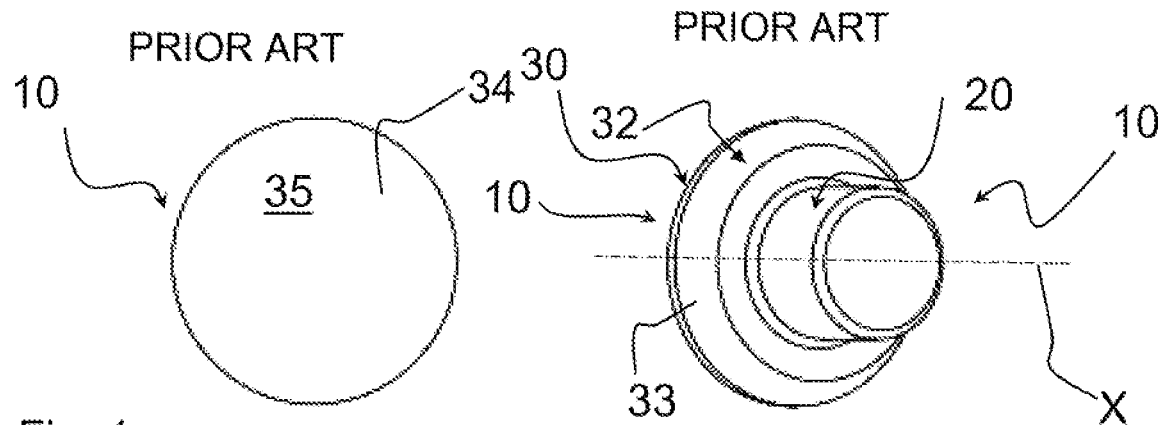

| | | | |
|---|---|---|---|
| 6,022,284 A | 2/2000 | Bartolozzi et al. | |
| 6,572,500 B2* | 6/2003 | Tetsuka | B62M 9/10 |
| | | | 474/160 |
| 6,805,645 B2* | 10/2004 | Mao | B62M 9/10 |
| | | | 474/152 |
| 8,235,850 B2* | 8/2012 | Lin | B62M 9/105 |
| | | | 474/160 |
| 8,550,944 B2* | 10/2013 | Esquibel | B62M 9/10 |
| | | | 474/160 |
| 9,457,870 B2* | 10/2016 | Sugimoto | B62M 9/105 |
| 9,701,364 B2* | 7/2017 | Sugimoto | B62M 1/36 |
| 2005/0282671 A1* | 12/2005 | Emura | B62M 9/06 |
| | | | 474/160 |
| 2010/0081531 A1* | 4/2010 | Esquibel | B62M 9/10 |
| | | | 474/160 |
| 2015/0130256 A1 | 5/2015 | Liu | |
| 2015/0210352 A1* | 7/2015 | Sugimoto | B62M 9/105 |
| | | | 474/80 |
| 2015/0274256 A1* | 10/2015 | Braun | B62M 9/131 |
| | | | 474/80 |

OTHER PUBLICATIONS

Mar. 31, 2020 Chinese Office Action in Chinese Application No. 201710962279.5 with English translation.

* cited by examiner

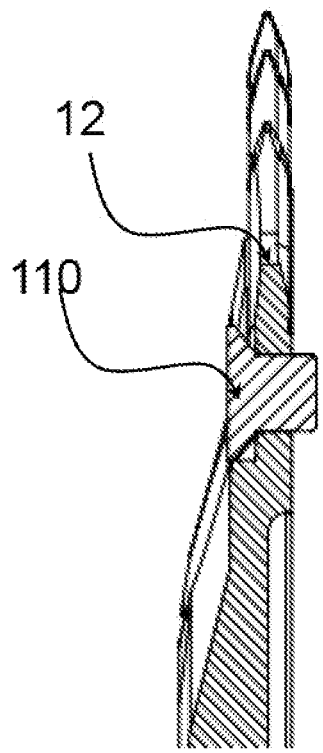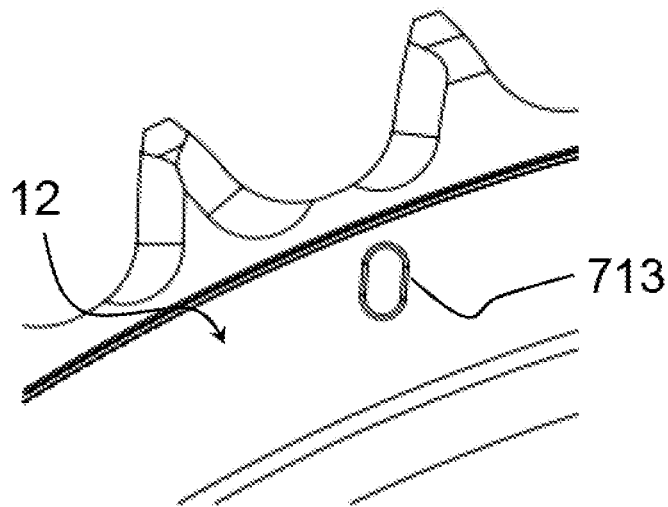
Fig. 19c　　　　　　　　　　Fig. 19d
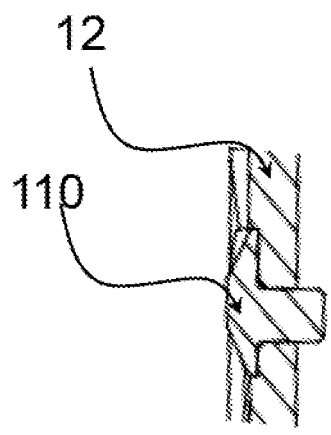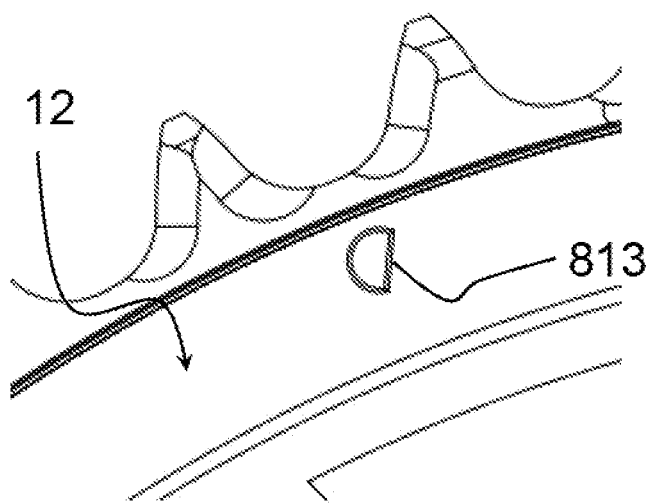
Fig. 20c　　　　　　　　　　Fig. 20d

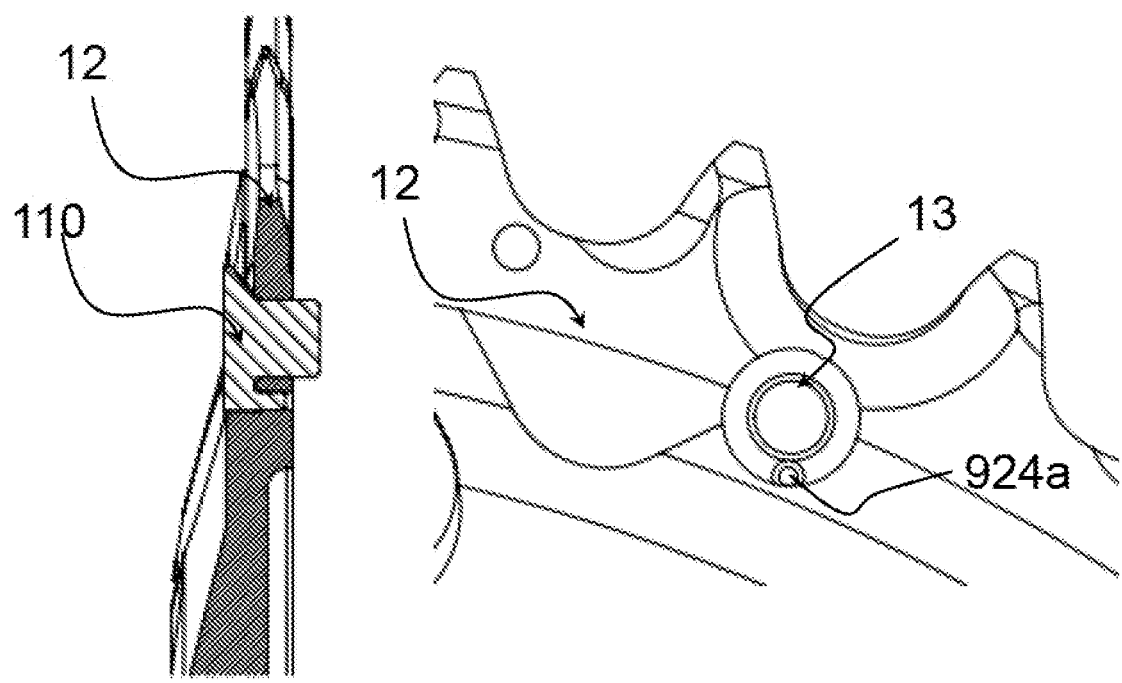
Fig. 21c                    Fig. 21d

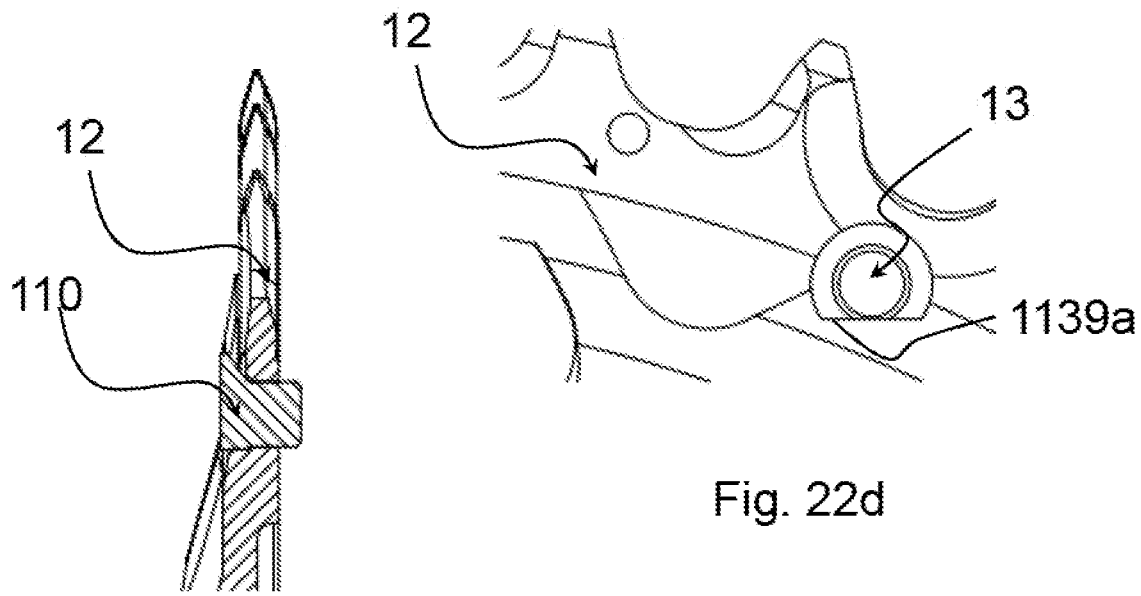
Fig. 22c
Fig. 22d
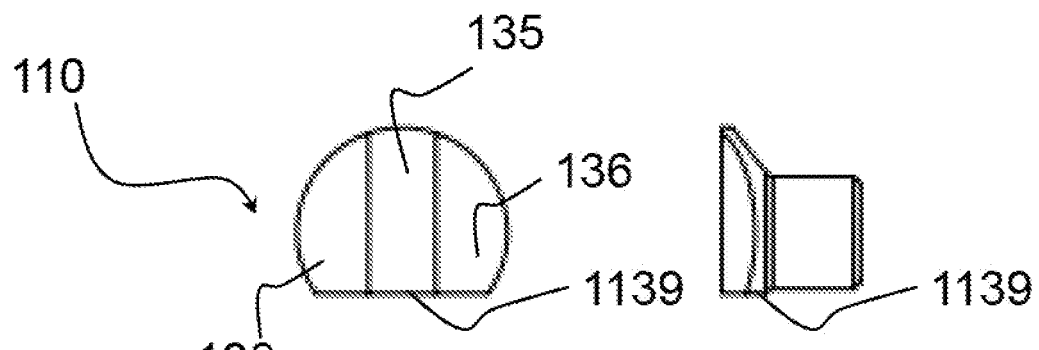
Fig. 22e
Fig. 22f
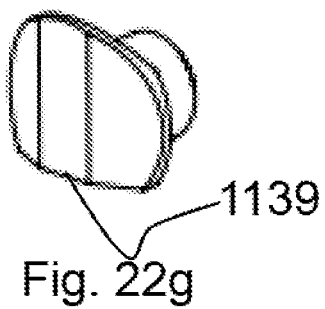
Fig. 22g

PIN FOR A CROWN OF A BICYCLE CRANKSET

CROSS REFERENCE TO RELATED APPLICATION

This application claims the benefit of Italian Application No. 102016000103875, filed on Oct. 17, 2016, which is incorporated herein by reference as if fully set forth.

FIELD OF INVENTION

The present invention relates to a pin for a crown of a bicycle crankset, in particular for a racing bicycle.

The present invention also relates to a crown comprising such a pin or configured to house such a pin, as well as a bicycle crankset comprising such a crown.

BACKGROUND

Throughout the present description and in the following claims, the term "pin" is used to indicate an element associated with, or formed in a single piece with, a crown of a bicycle crankset and configured to facilitate the movement of a bicycle chain on such a crown from another crown adjacent thereto, wherein this other crown has a diameter smaller than that of the crown with/on which the pin is associated/formed.

As known, a bicycle is a mechanical device moved by muscular power, hence one of the main requirements to be satisfied in the field of bicycles, particularly racing bicycles, is to allow the best possible exploitation of such a muscular power.

In particular, in the field of racing bicycles it is attempted to meet this requirement by increasing the number of gear ratios.

A conventional motion transmission system comprises, in the rear part of the bicycle, a hub associated with the rear wheel of the bicycle and provided with a body, in the jargon called "freewheel body", capable of rotating idly with respect to the hub in one direction of rotation and of pushing the hub into rotation in the opposite direction. A sprocket assembly comprising a plurality of sprockets of increasing diameter is mounted on the freewheel body. In the field of racing bicycles, sprocket assemblies are known having nine, ten or even eleven sprockets.

The sprockets are in turn engaged and pushed in rotation by a chain, which receives the movement from at least one crown of the bicycle crankset. Such a crown is associated with one of the two crank arms coupled with the shaft of the bottom bracket of the bicycle. In the field of racing bicycles, cranksets are known having at least two crowns of increasing diameter, typically two or three crowns.

The movement of the chain between the sprockets of the sprocket assembly is carried out through a rear derailleur/gearshift, whereas the movement of the chain between the crowns of the crankset is carried out through a front derailleur/gearshift.

In order to facilitate the movement of the chain from a crown of smaller diameter to an adjacent crown of larger diameter, i.e. what in the jargon is called "upward gearshifting", a plurality of pins are associated with or formed on the crown of greater diameter. These pins project from such a crown towards the crown of smaller diameter.

The pins are usually arranged at a predetermined radial distance from the toothing of the crown of greater diameter. The pins may or may not be arranged along a same circumference on the crown.

In the prior art example shown in the attached FIGS. 1-4, a pin 10 comprises a mounting portion 20, extending along a longitudinal axis X of the pin 10 and configured to be fixed to a crown 12, and a chain engaging portion 30.

The chain engaging portion 30 comprises a first face 32 facing towards the mounting portion 20 and configured to engage a plate of an outer link 42 of a bicycle chain 40, and a second face 34 facing on the opposite way with respect to the mounting portion 20.

The first face 32 comprises a frusto-conical chain-engagement surface portion 33, which is indeed configured to engage such a plate of the outer link 42 of the chain 40.

The second face 34 consists of a surface portion 35 that is flat and perpendicular with respect to the longitudinal axis X.

Figure 3:
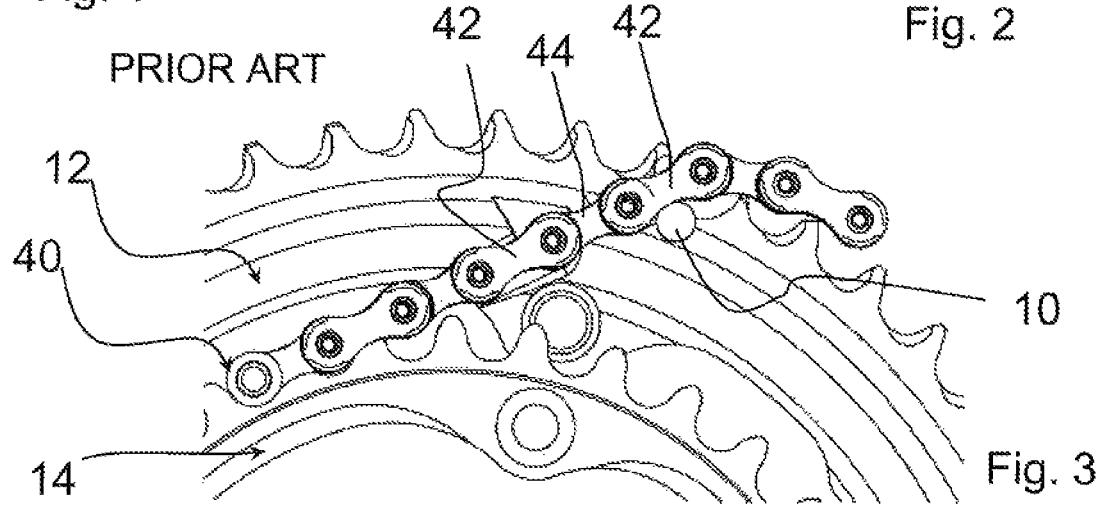

The Applicant has observed that the pin 10 and the crown 12 are sized and designed in order to promote upward gearshifting that takes place with the pin 10 that engages an outer link 42 of the chain 40 (such a circumstance is indicated hereinafter with the expression "outer link gearshifting"), as shown in FIG. 3.

In this way, upward gearshifting takes place in a linear and fluid manner, with clear performance advantages for the cyclist.

Figure 4:
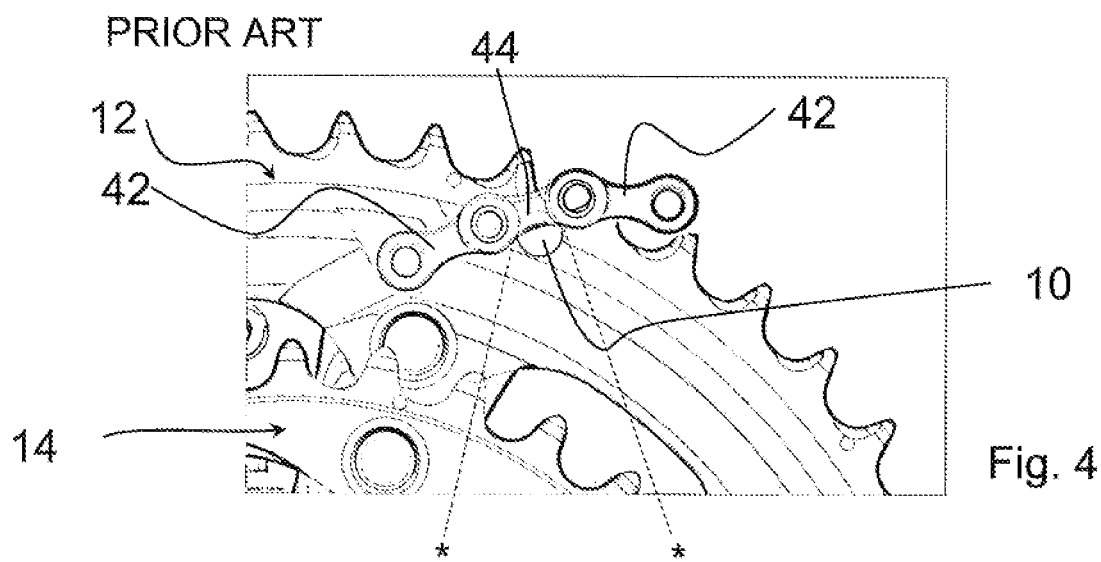

The Applicant has however observed that, with the pin 10 of the prior art described above, it may happen that the chain 40 is engaged and pushed upwards when at the pin 10 there is an inner link 44 of the chain 40 (such a circumstance is indicated hereinafter with the expression "inner link gearshifting"), as shown in FIG. 4. In this case, there is the risk both of not completing the gearshifting (i.e. the chain 40 does not succeed to reach the crown 12 and stays on the crown of smaller diameter 14 adjacent to the crown 12), and of dropping of the chain 40 from the crown 14.

The Applicant has found that the attempt of inner link gearshifting occurs when the two outer links 42 that precede and follow the inner link 44 arranged at the pin 10 contact the pin 10 itself (as shown in FIG. 4 at the points indicated by the broken lines which the reference mark * is associated with). This occurs because the surface portion 35 of the pin 10 is circular with a diameter of about 6 mm and the outer links 42 are about 4.5 mm spaced apart from each other.

The problem at the basis of the present invention is that of making a pin for a crown of a bicycle crankset that ensures outer link gearshifting and prevents attempts of inner link gearshifting.

SUMMARY

The present invention therefore generally relates to a pin for a crown of a bicycle crankset.

In particular, the present invention relates to a pin for a crown of a bicycle crankset, the pin comprising:

a mounting portion extending along a longitudinal axis of the pin and configured to be fixed to said crown, said mounting portion having a first dimension along a transversal direction perpendicular to said longitudinal axis;

a chain engaging portion associated with said mounting portion and having a second dimension greater than said first dimension along said transversal direction;

wherein said chain engaging portion comprises a first face facing towards said mounting portion and configured to engage a plate of a link of a bicycle chain, and a second face facing on the opposite way with respect to said mounting portion, and said second face comprises at least one first surface portion inclined with respect to said longitudinal axis by a first angle smaller than 90°, said first angle being measured in a longitudinal section plane of the pin that contains said longitudinal axis and is perpendicular to said transversal direction.

BRIEF DESCRIPTION OF THE DRAWING(S)

Figure 5:
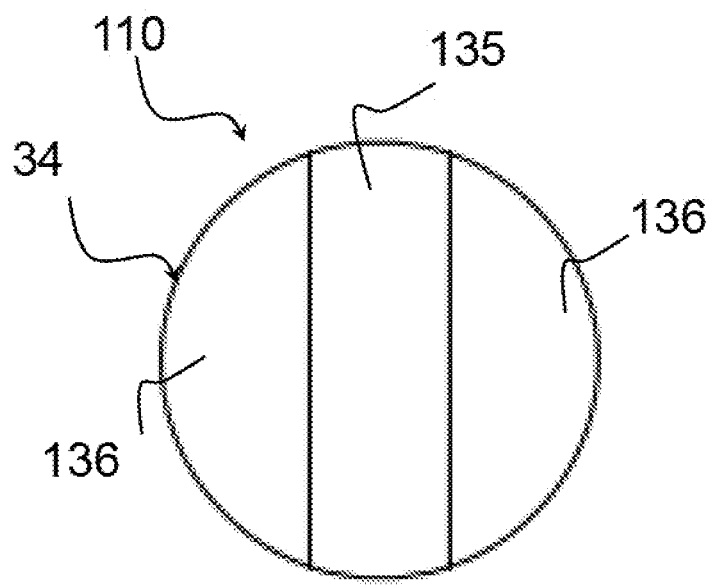
Figure 6:
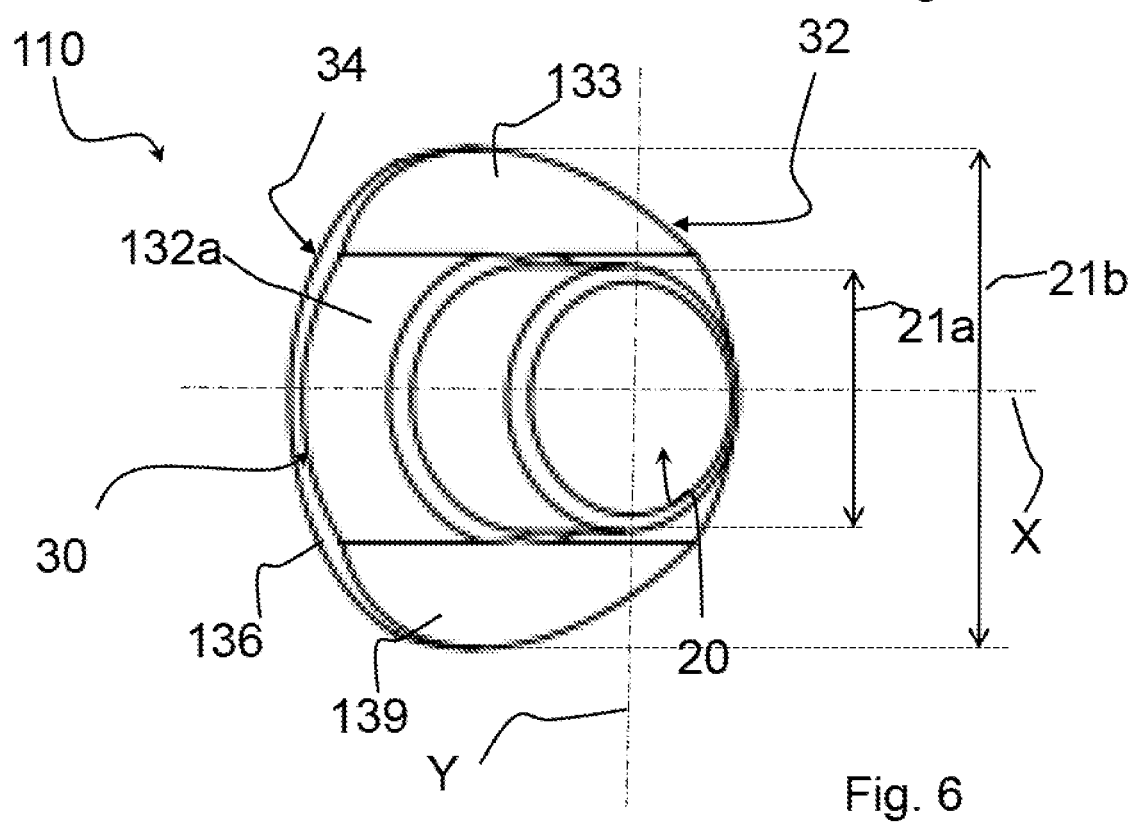
Figure 7:
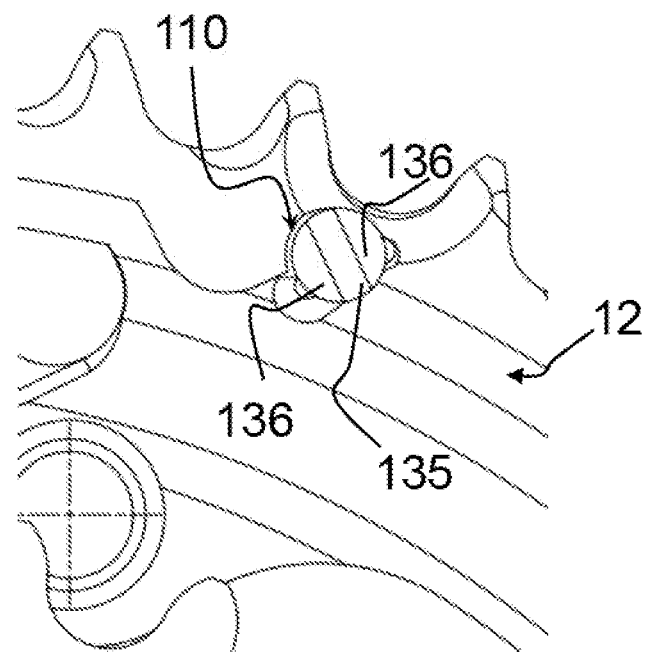
Figure 8:
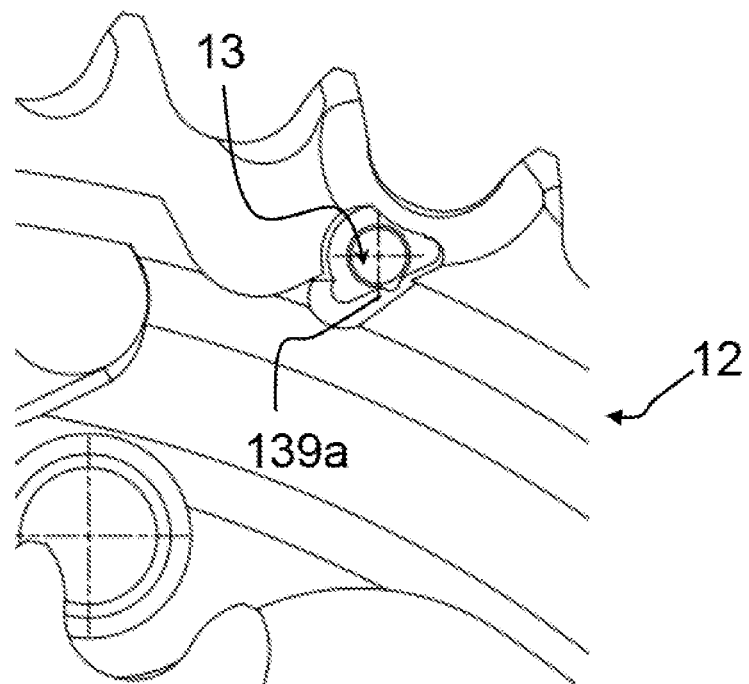
Figure 9:
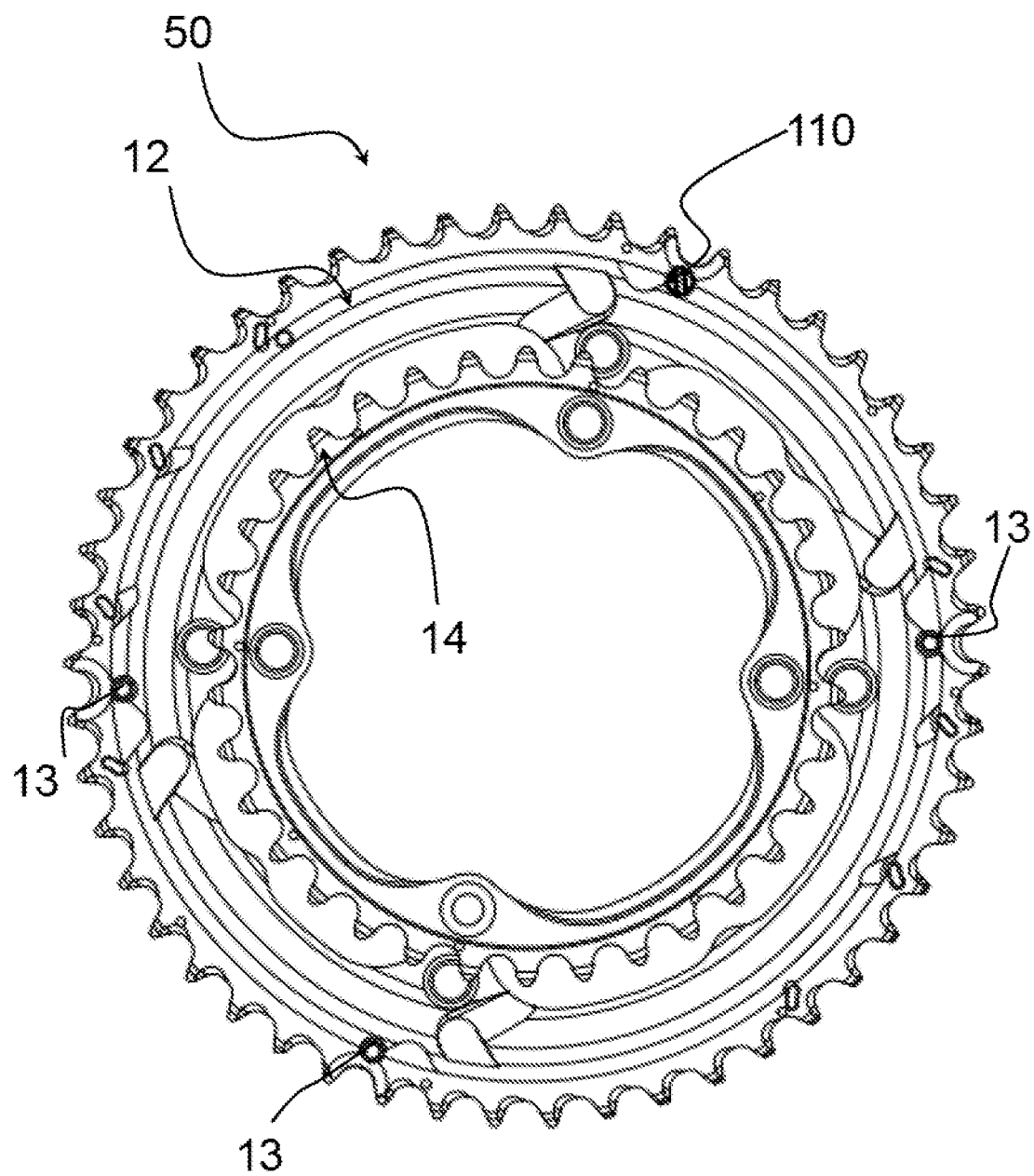
Figure 10A:
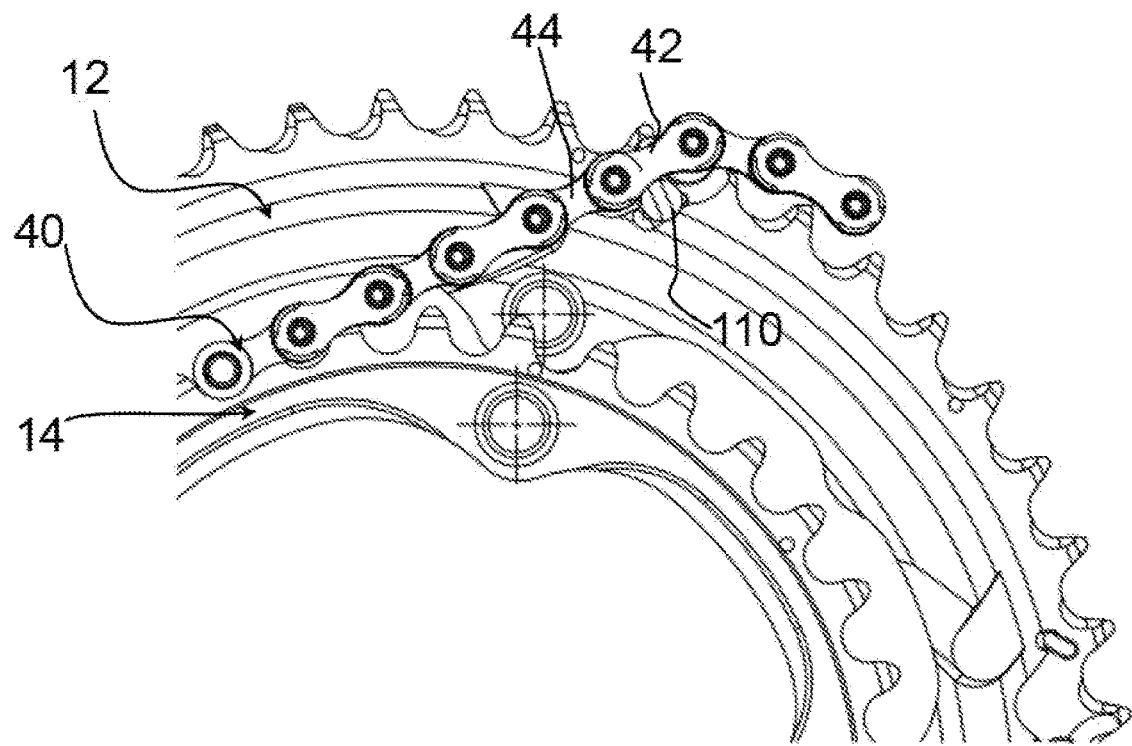
Figure 10B:
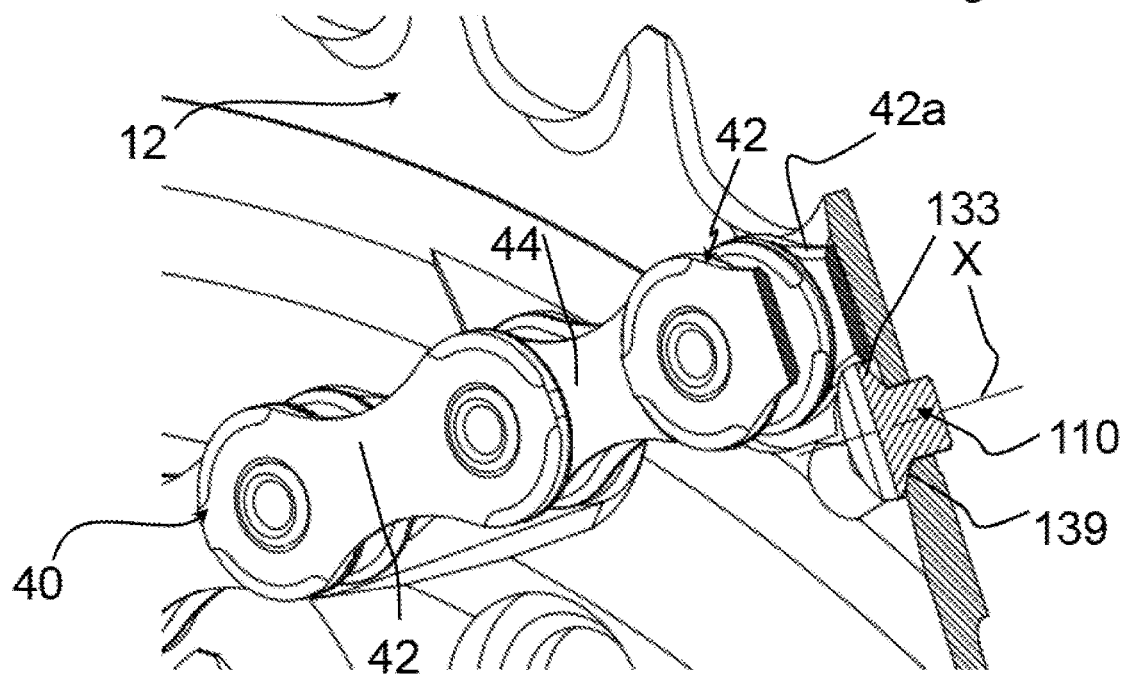
Figure 11A:
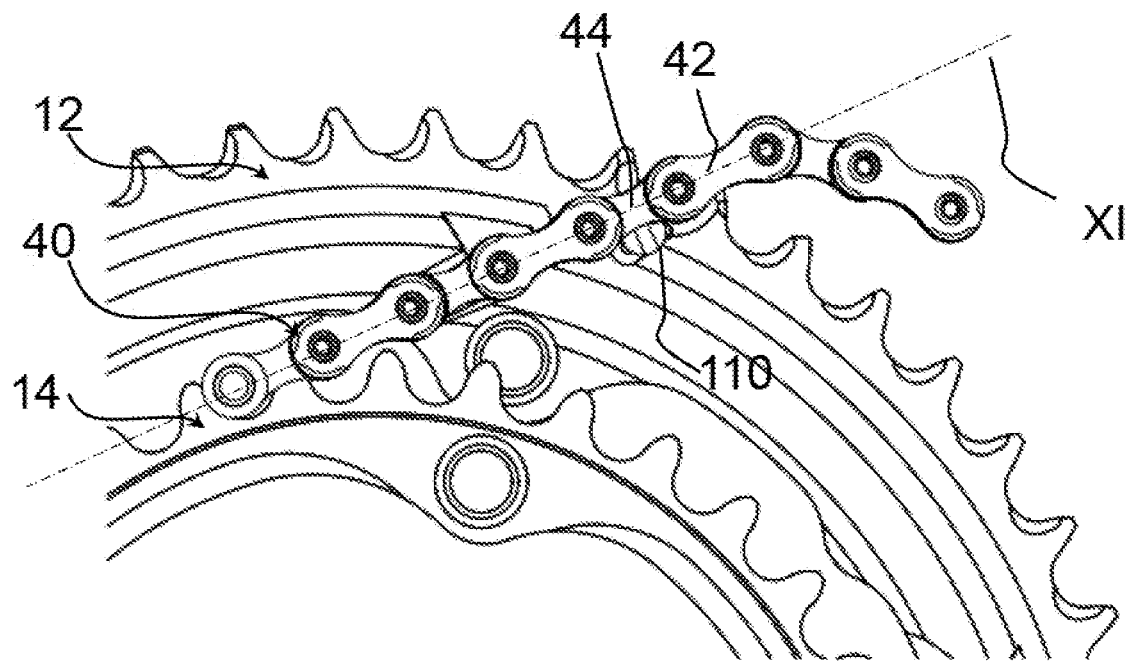
Figure 11B:
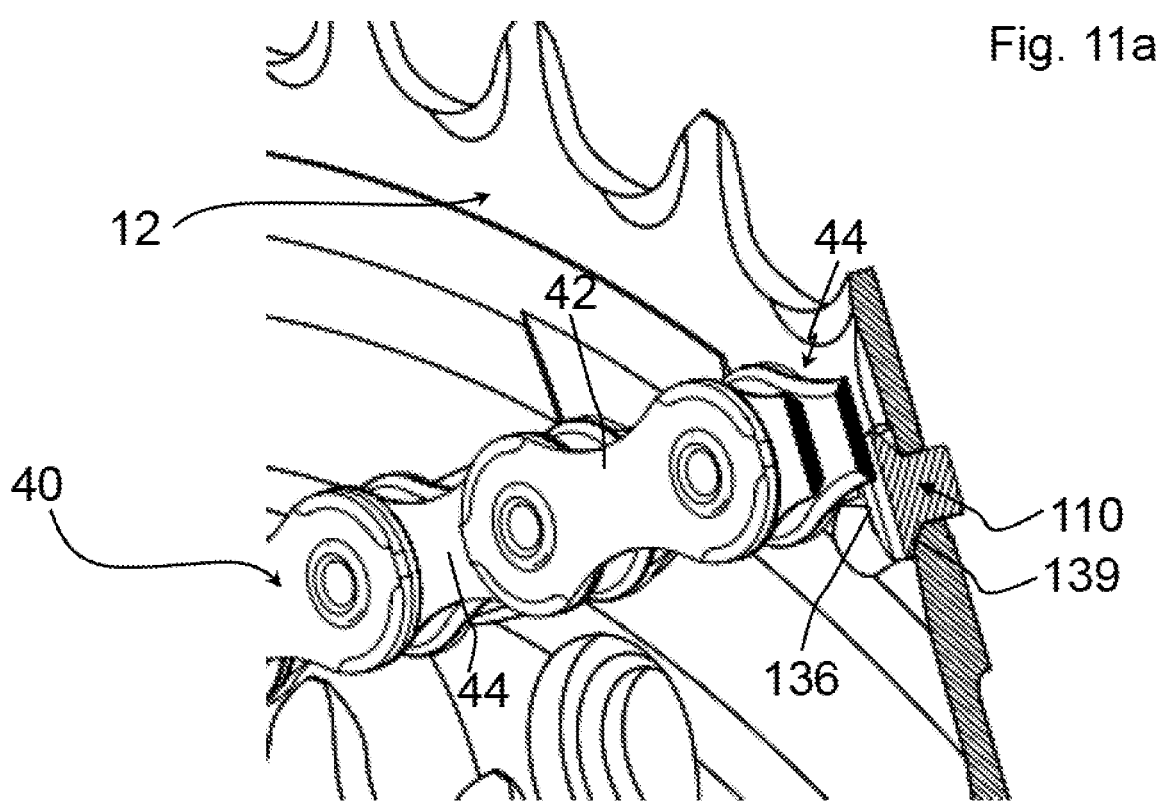
Figure 11C:
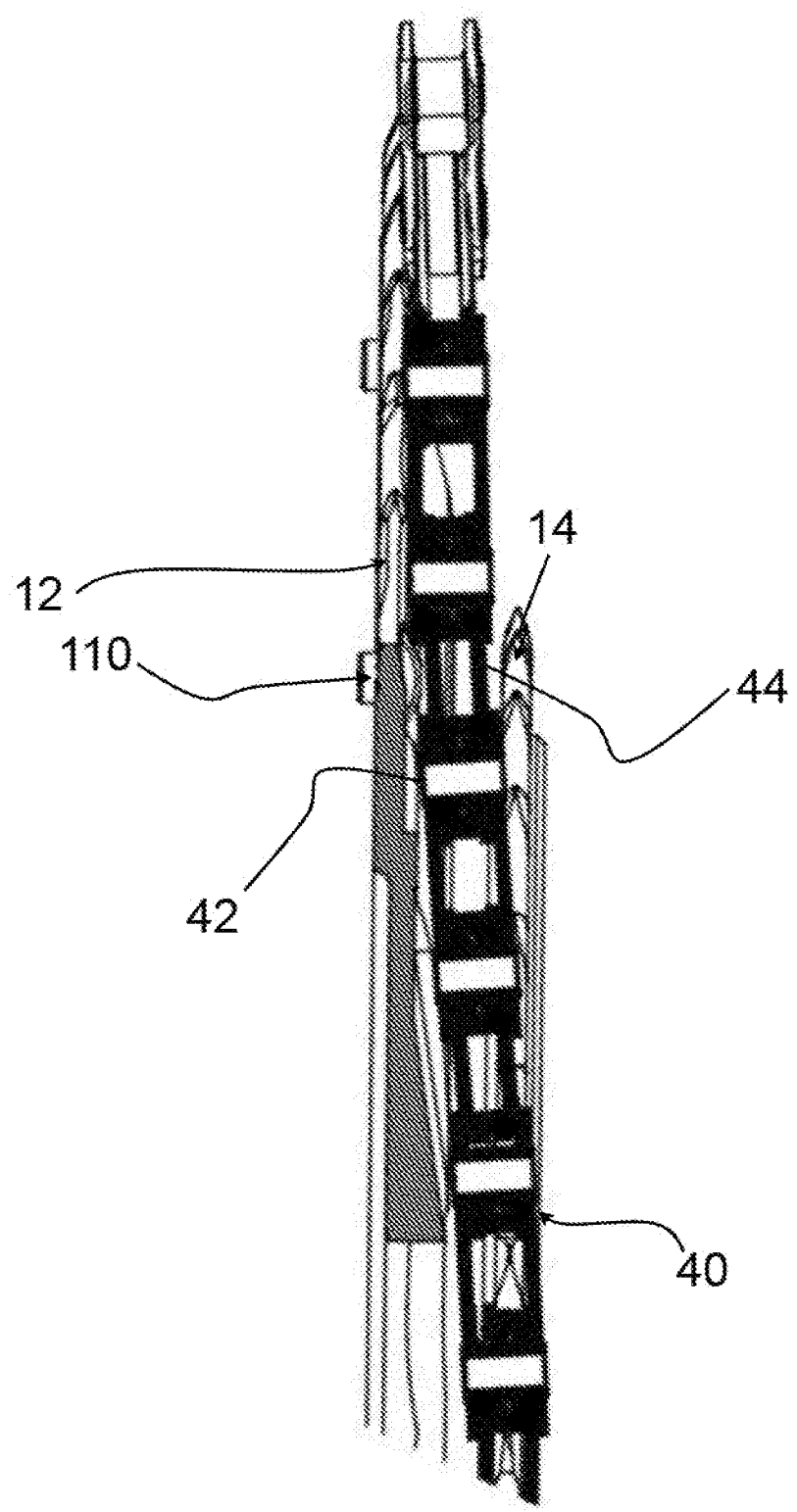
Figures 12A, 12B, 12C:
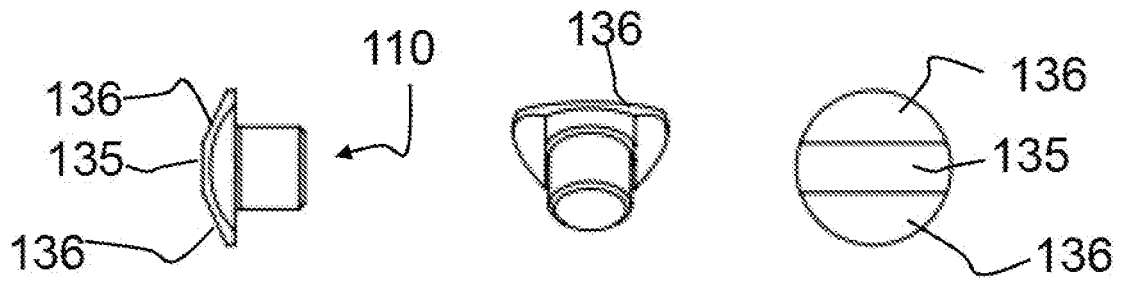
Figures 13A, 13B, 13C:
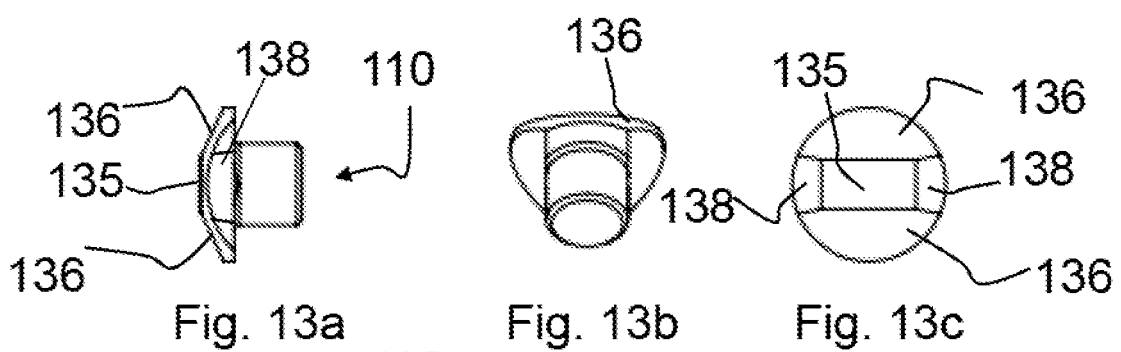
Figures 14A, 14B, 14C:
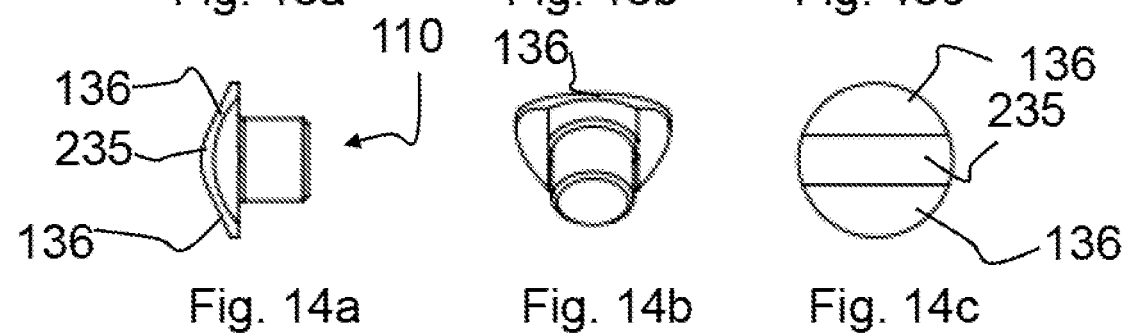
Figures 15A, 15B, 15C:
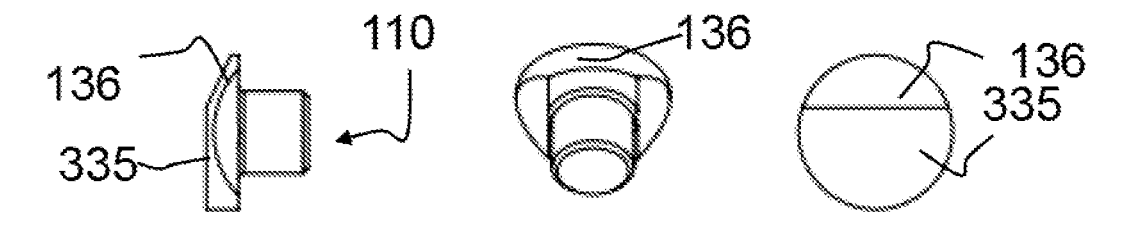
Figures 16A, 16B, 16C:
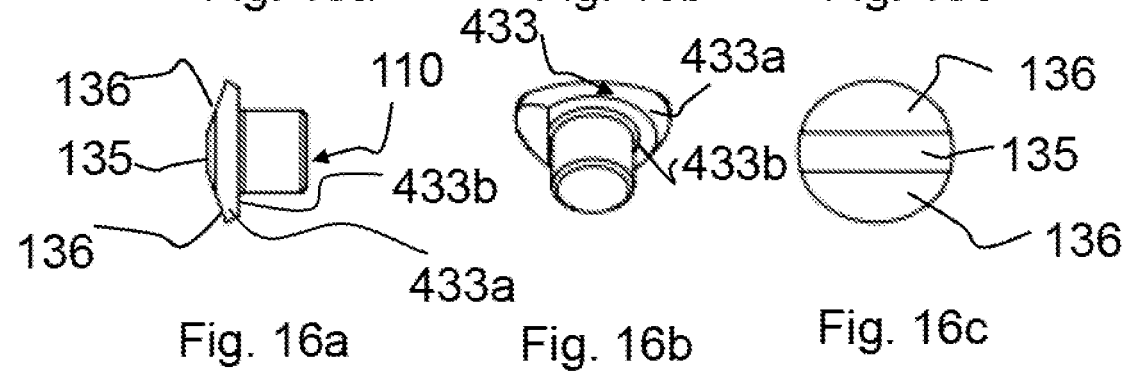
Figure 17A:
Figure 17B:
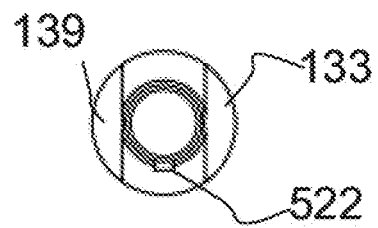
Figure 18A:
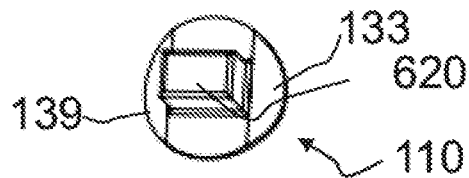
Figure 18B:
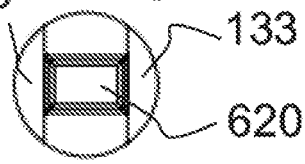
Figure 19A:
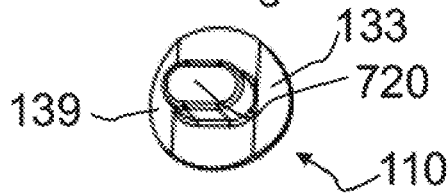
Figure 19B:
Figure 20A:
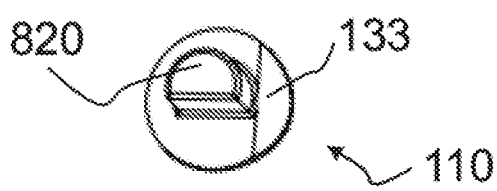
Figure 20B:
Figure 21A:
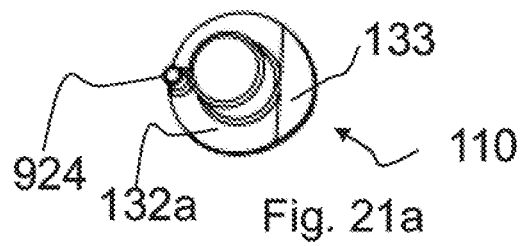
Figure 21B:
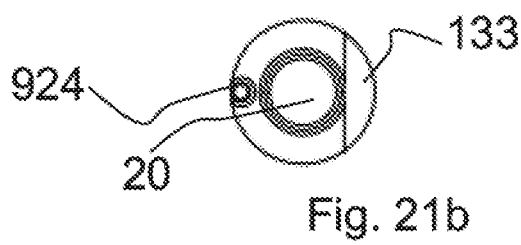
Figure 22A:
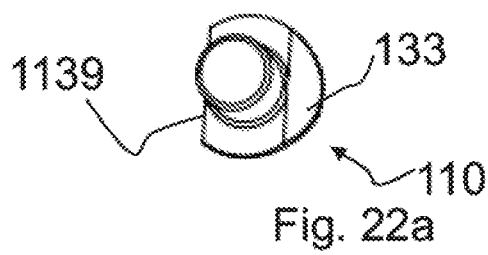
Figure 22B:
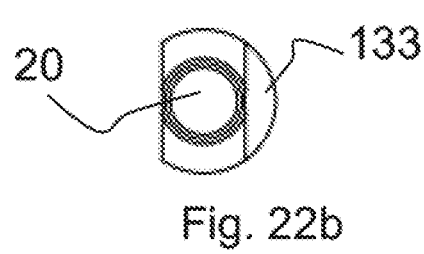
Figure 17C:
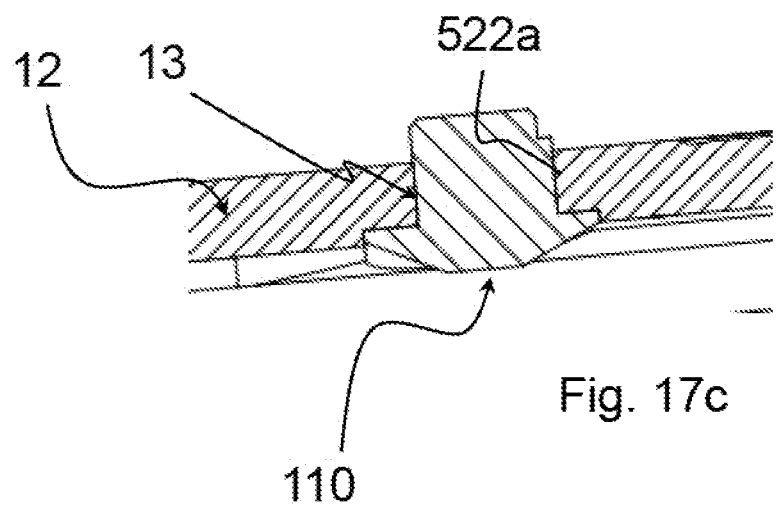
Figures 18C, 18D:
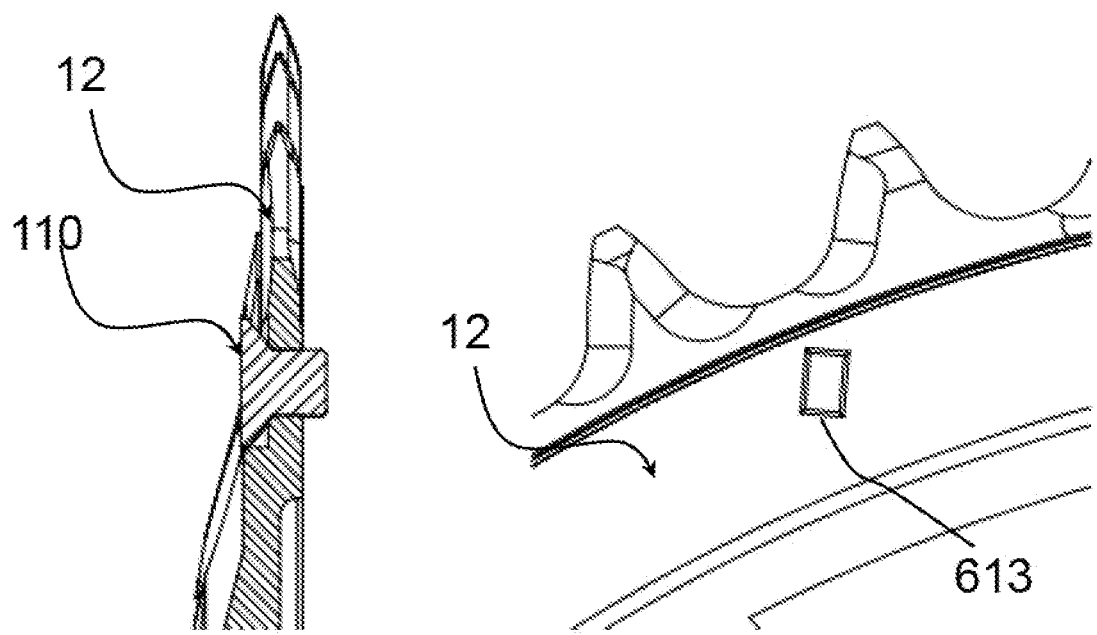

Further features and advantages of the present invention will become clearer from the following detailed description of some preferred embodiments thereof, made with reference to the attached drawings, given for indicating and not limiting purposes. In such drawings:

FIG. 1 schematically shows a front view of a pin for a crown of a bicycle crankset according to the prior art;

FIG. 2 schematically shows a perspective view of the prior pin of FIG. 1;

FIG. 3 schematically shows a front view of the prior pin of FIG. 1 mounted on a crown of a bicycle crankset, with a bicycle chain in an outer link upward gearshifting configuration;

FIG. 4 schematically shows a front view of the prior pin of FIG. 1 mounted on the crown of FIG. 3, with a bicycle chain in an inner link upward gearshifting configuration;

FIG. 5 schematically shows a front view of a pin according to the invention;

FIG. 6 schematically shows a perspective view of the pin of FIG. 5;

FIG. 7 schematically shows a front view of the pin of FIG. 5 mounted on a crown of a bicycle crankset, the crown being shown only partially;

FIG. 8 schematically shows a front view of the crown of FIG. 7, without the pin of FIG. 5;

FIG. 9 schematically shows a front view of the bicycle crankset of FIG. 7, the crowns of the crankset being shown in their entirety, wherein the pin of FIG. 5 is mounted in the crown of larger diameter;

FIG. 10a schematically shows a front view of the pin of FIG. 5 mounted on the crown of FIG. 7, with a bicycle chain in an outer link upward gearshifting configuration;

FIG. 10b schematically shows a perspective view of a portion of FIG. 10a, wherein pin, chain and crown are sectioned;

FIG. 11a schematically shows a front view of the pin of FIG. 5 mounted on the crown of FIG. 7, with the pin located at an inner link of the chain;

FIG. 11b schematically shows a perspective view of FIG. 11a, wherein pin, chain and crown are sectioned;

FIG. 11c schematically shows a side view of FIG. 11a, wherein chain and crown are sectioned according to the plane XI of FIG. 11a;

FIGS. 12a, 12b and 12c schematically show a side view, a perspective view and a front view of the pin of FIG. 5, respectively;

FIGS. 13a, 13b and 13c schematically show a side view, a perspective view and a front view of a first variant embodiment of the pin according to the invention, respectively;

FIGS. 14a, 14b and 14c schematically show a side view, a perspective view and a front view of a second variant embodiment of the pin according to the invention, respectively;

FIGS. 15a, 15b and 15c schematically show a side view, a perspective view and a front view of a third variant embodiment of the pin according to the invention, respectively;

FIGS. 16a, 16b and 16c schematically show a side view, a perspective view and a front view of a fourth variant embodiment of the pin according to the invention, respectively;

FIGS. 17a and 17b schematically show a perspective view and a rear view of a fifth variant embodiment of the pin according to the invention, respectively;

FIGS. 18a and 18b schematically show a perspective view and a rear view of a sixth variant embodiment of the pin according to the invention, respectively;

FIGS. 19a and 19b schematically show a perspective view and a rear view of a seventh variant embodiment of the pin according to the invention, respectively;

FIGS. 20a and 20b schematically show a perspective view and a rear view of an eighth variant embodiment of the pin according to the invention, respectively;

FIGS. 21a and 21b schematically show a perspective view and a rear view of a ninth variant embodiment of the pin according to the invention, respectively;

FIGS. 22a and 22b schematically show a perspective view and a rear view of a tenth variant embodiment of the pin according to the invention, respectively;

FIG. 17c schematically shows a longitudinal section view of the pin of FIGS. 17a and 17b, mounted on a crown of a bicycle crankset;

FIG. 18c schematically shows a longitudinal section view of the pin of FIGS. 18a and 18b, mounted on a crown of a bicycle crankset;

FIG. 18d schematically shows a front view of the crown of FIG. 18c;

FIG. 19c schematically shows a longitudinal section view of the pin of FIGS. 19a and 19b, mounted on a crown of a bicycle crankset;

FIG. 19d schematically shows a front view of the crown of FIG. 19c;

FIG. 20c schematically shows a longitudinal section view of the pin of FIGS. 20a and 20b, mounted on a crown of a bicycle crankset;

FIG. 20d schematically shows a front view of the crown of FIG. 20c;

FIG. 21c schematically shows a longitudinal section view of the pin of FIGS. 21a and 21b, mounted on a crown of a bicycle crankset;

FIG. 21d schematically shows a front view of the crown of FIG. 21c;

FIG. 22c schematically shows a longitudinal section view of the pin of FIGS. 22a and 22b, mounted on a crown of a bicycle crankset;

FIG. 22d schematically shows a front view of the crown of FIG. 22c;

FIGS. 22e, 22f and 22g schematically show a front view, a side view and a perspective view of the pin of FIGS. 22a and 22b, respectively.

DETAILED DESCRIPTION OF THE PREFERRED EMBODIMENT(S)

Throughout the present description and in the following claims, when values of angles are given they are meant to indicate absolute values measured with respect to the longitudinal axis of the pin.

Advantageously, the provision of the aforementioned inclined first surface portion allows avoiding any attempts of inner link gearshifting. Indeed, such an inclined surface portion defines, in the second face of the pin, a beveling that, when an inner link of the chain passes at the pin, avoids the contact between the pin and the outer link of the chain adjacent to the inner link that is located at the pin. In this way, the inner link of the chain slides on the pin without engaging the latter (thus avoiding any attempt of inner link gearshifting), until an outer link engages on the pin (thus allowing an outer link gearshifting).

The pin of the present invention can comprise one or more of the following preferred features, taken individually or in combination.

Preferably, the aforementioned first angle is comprised between 60° and 70°, the extreme values being included.

The Applicant has found that such values of the first angle constitute an optimal compromise between structural strength of the pin and prevention of any attempts of inner link gearshifting.

Preferably, said at least one first surface portion is flat.

Preferably, the second face of the pin comprises a second surface portion lying on a plane substantially perpendicular to said longitudinal axis.

More preferably, on the second face of the pin there are two of said first inclined surface portions arranged on opposite sides with respect to said second surface portion.

Advantageously, the provision of two inclined surface portions prevents any contact of the pin with two consecutive outer links of the chain, when the pin is at the inner link arranged between such two outer links.

Preferably, the second face of the pin comprises at least one third surface portion inclined with respect to said longitudinal axis by a second angle smaller than 90°, said second angle being measured in a longitudinal section plane of the pin that contains said longitudinal axis and said transversal direction.

More preferably, on the second face of the pin there are two of said third surface portions arranged on opposite sides with respect to said second surface portion and arranged between said two first surface portions.

Advantageously, the provision of said inclined third surface portions allows avoiding any possible contact between pin and outer links of the chain, when the pin is at the inner link arranged between such two outer links, irrespective of the mutual positioning between pin and outer links of the chain adjacent to the pin.

In a preferred embodiment of the pin of the invention, an anti-rotation abutment surface portion is provided on the first face of the pin. The anti-rotation abutment surface portion is configured to cooperate with a matching anti-rotation abutment surface portion formed on said crown when the mounting portion of the pin is fixed to said crown.

Advantageously, the anti-rotation abutment surface portion ensures the desired orientation of the aforementioned inclined first surface portions on the crown.

Preferably, said anti-rotation abutment surface portion is flat and is inclined with respect to said longitudinal axis by a third angle greater than 90°, said third angle being measured in a longitudinal section plane of the pin that contains said longitudinal axis and said transversal direction.

Preferably, the first face of the pin comprises a chain-engagement surface portion which is flat and configured to engage said plate of the link of the chain. More preferably, said chain-engagement surface portion is inclined with respect to said longitudinal axis by a fourth angle greater than 90°, said fourth angle being measured in a longitudinal section plane of the pin that contains said longitudinal axis and said transversal direction.

Advantageously, such a chain-engagement surface portion ensures an effective engagement of the plate of the link of the chain on the pin.

Preferably, said chain-engagement surface portion and said anti-rotation abutment surface portion are symmetrically arranged on opposite sides with respect to said mounting portion.

More preferably, said fourth angle has a size equal to that of said third angle.

Advantageously, such a provision allows using the chain-engagement surface portion as anti-rotation abutment surface portion and vice-versa, so that the mounting of the pin on the crown is facilitated.

Preferably, the first face of the pin comprises an abutment surface configured to abut against said crown, wherein said mounting portion extends along said longitudinal axis from said abutment surface.

In a second aspect thereof, the present invention relates to a crown for a bicycle crankset, characterized in that it comprises at least one pin according to the first aspect of the invention.

In a third aspect thereof, the present invention relates to a crown for a bicycle crankset, comprising a housing seat of a pin, characterized in that said housing seat comprises an anti-rotation abutment surface portion configured to cooperate with a matching anti-rotation abutment surface portion formed on said pin, when said pin is housed in said housing seat.

In a further aspect thereof, the present invention relates to a crankset characterized in that it comprises at least one crown according to the second or third aspect of the invention.

With reference to FIGS. 5 and 6, a pin for a crown of a bicycle crankset in accordance with a preferred embodiment of the present invention is shown. The pin is wholly indicated with 110.

Throughout the description and in FIG. 5 and thereafter, the parts and components that are present both in FIGS. 1-4 and in FIG. 5 and thereafter will be indicated with the same reference numeral.

With reference to FIG. 6, the pin 110 comprises a mounting portion 20, extending along a longitudinal axis X of the pin 110 and configured to be fixed to a crown 12 (FIGS. 7-9), and a chain engaging portion 30 made in one piece therewith.

The mounting portion 20 has a first dimension 21a along a transversal direction Y perpendicular to the longitudinal axis X.

The chain engaging portion 30 has, along the transversal direction Y, a second dimension 21b greater than the first dimension 21a (FIG. 6).

In the non-limiting example of FIG. 6, the mounting portion 20 is substantially cylindrical.

The chain engaging portion 30 comprises a first face 32 facing towards the mounting portion 20 and configured to engage a plate 42a of an outer link 42 of a bicycle chain 40 (as shown in FIGS. 10a and 10b), and a second face 34 facing on the opposite way with respect to the mounting portion 20.

As known and shown in FIGS. 10a, 10b and 11a-11c, the chain 40 comprises a succession of outer links 42 and inner links 44, which alternates with each other.

The first face 32 comprises an abutment surface 132a configured to abut against the crown 12. The mounting portion 20 extends along the longitudinal axis X from said abutment surface 132a. Preferably, the abutment surface 132a is flat.

The first face 32 further comprises a chain-engagement surface portion 133 configured to engage the plate 42a of the outer link 42 of the chain 40, as shown in FIG. 10b.

The chain-engagement surface portion 133 is inclined with respect to the longitudinal axis X by an angle greater than 90°. Such an angle is measured in a longitudinal section plane of the pin 110 that contains the longitudinal axis X and the transversal direction Y. Preferably, such an angle is comprised between 125° and 135°, the extreme values being included, for example it is equal to about 127°.

In the non-limiting example of FIG. 6, the chain-engagement surface portion 133 is flat and extends up to the mounting portion 20.

Furthermore, the first face 32 comprises an anti-rotation abutment surface portion 139 configured to cooperate with a matching anti-rotation abutment surface portion 139a formed on the crown 12 (FIG. 8) when the mounting portion 20 is fixed to the crown 12.

In the non-limiting example of FIG. 6, the anti-rotation abutment surface portion 139 is flat and is inclined with respect to the longitudinal axis X by an angle greater than 90°. Such an angle is measured in a longitudinal section plane of the pin 110 that contains the longitudinal axis X and the transversal direction Y. Preferably, such an angle is comprised between 125° and 135°, the extreme values being included, for example it is equal to about 127°.

In the non-limiting example of FIG. 6, the chain-engagement surface portion 133 and the anti-rotation abutment surface portion 139 are symmetrically arranged on opposite sides with respect to the mounting portion 20 and the angle of inclination of the chain-engagement surface portion 133 has a size equal to that of the angle of inclination of the anti-rotation abutment surface portion 139.

FIG. 9 shows a bicycle crankset 50 comprising the crown 12 and an adjacent crown 14 having a diameter smaller than that of the crown 12.

The crown 12 comprises a plurality of housing seats 13 for housing the pins 110. In the non-limiting example of FIG. 9, there are four housing seats 13 (in FIG. 9, a pin 110 is housed in a housing seat 13, whereas pins are yet to be housed in the other three housing seats 13).

In mounting operation, the first face 32 of the pins 110 must face towards the crown 12 (and the respective housing seats 13), whereas the second face 34 faces towards the crown 14.

As shown in FIG. 8, the housing seat 13 comprises the anti-rotation abutment surface portion 139a configured to cooperate with the matching anti-rotation abutment surface portion 139 formed on the pin 110.

In the non-limiting example of FIG. 8, the anti-rotation abutment surface portion 139a is flat and is inclined with respect to a rotation axis of the crown 12 by an angle smaller than 90°. Such an angle is substantially equal to the angle of inclination of the anti-rotation abutment surface portion 139.

The second face 34 of the pin 110 comprises a first surface portion 136 inclined with respect to the longitudinal axis X by an angle smaller than 90°. Such an angle is measured in a longitudinal section plane of the pin 110 that contains the longitudinal axis X and is perpendicular to the transversal direction Y. Preferably, such an angle is comprised between 60° and 70°, the extreme values being included, for example it is equal to about 65°.

In the non-limiting example of FIG. 5, the second face 34 of the pin 110 comprises a further first surface portion 136 inclined with respect to the longitudinal axis X and having identical inclination to that of the aforementioned first surface portion 136.

The two first surface portions 136 are flat and are arranged on opposite sides with respect to a second surface portion 135 lying on a plane substantially perpendicular to the longitudinal axis X.

FIGS. 12a-12c show the same pin 110 of FIGS. 5 and 6 just described.

FIGS. 13a-13c, 14a-14c, 15a-15c and 16a-16c show four first variant embodiments of the pin 110 of the invention. In particular, the pin 110 of the first three variant embodiments of FIGS. 13a-13c, 14a-14c and 15a-15c differs from the pin 110 of FIGS. 5 and 6 solely in the second face 34, as is described hereinafter.

In the first variant embodiment (FIGS. 13a-13c), the second face 34 of the pin 110 differs from that of the pin 110 of FIGS. 5 and 6 in that it comprises two third surface portions 138 inclined with respect to the longitudinal axis X by an angle smaller than 90°. Such an angle is measured in a longitudinal section plane of the pin 110 that contains the longitudinal axis X and the transversal direction Y. Preferably, such an angle is comprised between 75° and 85°, the extreme values being included.

The two third surface portions 138 are flat, are arranged on opposite sides with respect to the second surface portion 135 and are arranged between the two first surface portions 136 (FIG. 13c).

In the second variant embodiment (FIGS. 14a-14c), the second face 34 of the pin 110 differs from that of the pin 110 of FIGS. 5 and 6 in that it comprises, instead of the flat surface portion 135, a convex surface portion 235 extending along the transversal direction Y.

In the third variant embodiment (FIGS. 15a-15c), the second face 34 of the pin 110 differs from that of the pin 110 of FIGS. 5 and 6 in that it comprises a single first surface portion 136.

Furthermore, the second face 34 comprises a surface portion 335 lying on a plane substantially perpendicular to the longitudinal axis X. The surface portion 335 is analogous to the second surface portion 135 of the pin 110 of FIGS. 5 and 6 and has a greater surface extension with respect to the latter (FIG. 15c).

In the fourth variant embodiment (FIGS. 16a-16c), the second face 34 of the pin 110 is analogous to that of the pin 110 of FIGS. 5 and 6.

Unlike the pin 110 of FIGS. 5 and 6, the first face 32 of the pin 110 of this fourth variant embodiment comprises a frusto-conical chain-engagement surface portion 433. In particular, the latter comprises a wall 433a inclined with respect to the longitudinal axis X by an angle different from 90° and a wall 433b perpendicular to the longitudinal axis X and configured to abut against the crown 12.

FIGS. 17a-17b, 18a-18b, 19a-19b, 20a-20b, 21a-21b and 22a-22b show six further variant embodiments of the pin 110 of the invention. In particular, the pin 110 of these six variant embodiments differs from the pin 110 of FIGS. 5 and 6 substantially in the anti-rotation abutment means of the pin 110, i.e. in the means provided for performing the same function as the anti-rotation abutment surface portion 139 of the pin 110 of FIGS. 5 and 6.

In the fifth variant embodiment (FIGS. 17a-17b), the mounting portion 20 of the pin 110 differs from that of the pin 110 of FIGS. 5 and 6 in that it comprises an element with flat faces 522. The element with flat faces 522 engages within a corresponding seat portion with flat faces 522a formed in the housing seat 13 of the crown 12 (FIG. 17c).

In the sixth variant embodiment (FIGS. 18a-18b), the mounting portion 620 of the pin 110 differs from that of the pin 110 of FIGS. 5 and 6 in that it has a substantially rectangular cross section. The mounting portion 620 engages within a corresponding substantially rectangular housing seat 613 of the crown 12 (FIGS. 18c and 18d).

In the seventh variant embodiment (FIGS. 19a-19b), the mounting portion 720 of the pin 110 differs from that of the pin 110 of FIGS. 5 and 6 in that it has a substantially elliptical cross section (i.e. a cross-section substantially rectangular having the two smaller sides semi-circular). The mounting portion 720 engages within a corresponding substantially elliptical housing seat 713 (i.e. a housing seat substantially rectangular with the two smaller sides semi-circular) of the crown 12 (FIGS. 19c and 19d).

In the eighth variant embodiment (FIGS. 20a-20b), the mounting portion 820 of the pin 110 differs from that of the pin 110 of FIGS. 5 and 6 in that it has a cross section shaped substantially like a circular segment. The mounting portion 820 engages in a corresponding housing seat 813 (substantially shaped like a circular segment) of the crown 12 (FIGS. 20c and 20d).

In this case, since a single orientation of the mounting portion 820 of the pin 110 is possible in the housing seat 813 of the crown 12, the anti-rotation abutment surface portion 139 of the pin 110 of FIGS. 5 and 6 is not provided.

In the ninth variant embodiment (FIGS. 21a-21b), the pin 110 differs from the pin 110 of FIGS. 5 and 6 substantially in that it comprises a pin 924 extending canti-levered, parallel to the longitudinal axis X, from the flat abutment surface 132a of the chain engaging portion 30. The pin 924 engages in a corresponding recess 924a formed on the crown 12 close to the housing seat 13 (FIGS. 21c and 21d).

Also in this case, since a single orientation of the pin 110 is possible in the housing seat 13 of the crown 12, the anti-rotation abutment surface portion 139 of the pin 110 of FIGS. 5 and 6 is not provided.

In the tenth variant embodiment (FIGS. 22a-22b and 22e-22g), the pin 110 differs from the pin 110 of FIGS. 5 and 6 substantially in that the chain engaging portion 30 comprises an anti-rotation abutment surface portion 1139 lying on a plane substantially parallel to the longitudinal axis X. The anti-rotation abutment surface portion 1139 has the same function and replaces the anti-rotation abutment surface portion 139 of the pin 110 of FIGS. 5 and 6.

The anti-rotation abutment surface portion 1139 engages within the housing seat 13 of the crown 12, which comprises a corresponding anti-rotation abutment surface portion 1139a (FIGS. 22c and 22d), lying on a plane substantially parallel to the rotation axis of the crown 12.

During pedaling, when the cyclist commands upward gearshifting, the chain 40 is moved from the crown 14 of smaller diameter to the crown 12.

The chain 40 passes over the pin 110 of the invention, until the chain-engagement surface portion 133, 433 engages a plate 42a of an outer link 42 of the chain 40, as shown in FIG. 10b.

The provision of the first surface portions 136 inclined with respect to the longitudinal axis X makes it possible to prevent any attempts of inner link gearshifting. Indeed, as shown in FIGS. 11a-11c, when an inner link 44 of the chain 40 passes at the pin 110, the presence of the aforementioned first surface portions 136 prevents any contact between the pin 110 and the chain 40 until an outer link 42 of the chain 40 is engaged by the pin 110, thus allowing an outer link gearshifting (FIG. 10b).

Of course, those skilled in the art can bring numerous modifications and variants to the invention described above, in order to satisfy specific and contingent requirements, all of which are in any case within the scope of protection of the present invention as defined by the following claims.

In particular, all of the combinations of features of the pin 110 described with reference to the preferred embodiment shown in FIGS. 5-9, 10a-10b, 11a-11c and 12a-12c and the features of the pin 110 described with reference to the ten variant embodiments shown in the following figures are possible.

What is claimed is:

1. A pin for a crown of a bicycle crankset, the pin comprising:
   a mounting portion extending along a longitudinal axis (X) of the pin and configured to be fixed to said crown, said mounting portion having a first dimension along a transversal direction (Y) perpendicular to said longitudinal axis (X);
   a chain engaging portion associated with said mounting portion and having a second dimension greater than said first dimension along said transversal direction wherein said chain engaging portion comprises a first face facing towards said mounting portion and configured to engage a plate of a link of a bicycle chain, and a second face facing opposite to said mounting portion;
   said second face comprises at least one first surface portion inclined with respect to said longitudinal axis (X) by a first angle smaller than 90°, said first angle being measured in a longitudinal section plane of the pin that contains said longitudinal axis (X) and is perpendicular to said transversal direction (Y),
   wherein said chain engaging portion is configured to orient said at least one first surface portion with respect to said crown when said mounting portion is fixed to said crown, and said chain engaging portion is provided with one of the following:
   a) an anti-rotation abutment surface portion defined on said first face and configured to cooperate with a matching anti-rotation abutment surface portion formed on said crown, or
   b) a pin extending cantilevered, parallel to the longitudinal axis (X), from said first face and configured to engage in a corresponding recess formed on the crown, or
   c) an anti-rotation abutment surface portion lying on a plane substantially parallel to the longitudinal axis (X) and configured to engage in a corresponding anti-rotation abutment surface portion formed on the crown and lying on a plane substantially parallel to a rotation axis of the crown.

2. The pin according to claim 1, wherein said first angle is in a range between 60° and 70°.

3. The pin according to claim 1, wherein said at least one first surface portion is flat.

4. The pin according to claim 1, wherein said second face comprises a second surface portion lying on a plane substantially perpendicular to said longitudinal axis (X).

5. The pin according to claim 4, wherein said at least one first surface portion comprises two first surface portions arranged on opposite sides with respect to said second surface portion.

6. The pin according to claim 5, wherein said second face comprises at least one third surface portion that comprises two third surface portions arranged on opposite sides with respect to said second surface portion and between said two first surface portions.

7. The pin according to claim 1, wherein said second face comprises at least one third surface portion inclined with respect to said longitudinal axis (X) by a second angle that is different from the first angle and is smaller than 90°, said second angle being measured in a longitudinal section plane of the pin that contains said longitudinal axis (X) and said transversal direction (Y).

8. The pin according to claim 1, wherein said first face comprises an anti-rotation abutment surface portion configured to cooperate with a matching anti-rotation abutment surface portion formed on said crown when said mounting portion is fixed to said crown.

9. The pin according to claim 8, wherein said anti-rotation abutment surface portion is flat by a third angle greater than 90° as measured in a longitudinal section plane of the pin that contains said longitudinal axis (X) and said transversal direction (Y).

10. The pin according to claim 9, wherein said first face comprises a chain-engagement surface portion inclined with respect to said longitudinal axis (X) by a fourth angle measured in a longitudinal section plane of the pin that contains said longitudinal axis (X) and said transversal direction (Y) and said fourth angle has a size equal to that of said third angle.

11. The pin according to claim 1, wherein said first face comprises a chain-engagement surface portion which is flat and configured to engage said plate of the link of the chain, and said chain-engagement surface portion is inclined with respect to said longitudinal axis (X) by a fourth angle greater than 90°, said fourth angle being measured in a longitudinal section plane of the pin that contains said longitudinal axis (X) and said transversal direction (Y).

12. The pin according to claim 11, wherein said first face comprises an anti-rotation abutment surface portion and said chain-engagement surface portion and said anti-rotation abutment surface portion are symmetrically arranged on opposite sides with respect to said mounting portion.

13. The pin according to claim 1, wherein said first face comprises an abutment surface configured to abut against said crown and said mounting portion extends along said longitudinal axis (X) from said abutment surface.

14. A crown for a bicycle crankset that comprises at least one pin according to claim 1.

15. A crown for a bicycle crankset, comprising a housing seat for the pin according to claim 1, wherein said housing seat comprises a matching anti-rotation abutment surface portion configured to cooperate with the anti-rotation abutment surface portion formed on said chain engaging portion of the pin when said pin is housed in said housing seat.

16. A pin for a crown of a bicycle crankset, the pin comprising:
a mounting portion extending along a longitudinal axis (X) of the pin and configured to be fixed to said crown, said mounting portion having a first dimension along a transversal direction (Y) perpendicular to said longitudinal axis (X);
a chain engaging portion associated with said mounting portion and having a second dimension greater than said first dimension along said transversal direction (Y);
wherein said chain engaging portion comprises a first face facing towards said mounting portion and configured to engage a plate of a link of a bicycle chain, and a second face facing opposite to said mounting portion;
said second face comprises at least one first surface portion inclined with respect to said longitudinal axis (X) by a first angle smaller than 90°, said first angle being measured in a longitudinal section plane of the pin that contains said longitudinal axis (X) and is perpendicular to said transversal direction (Y) and, said first face comprises a chain-engagement surface portion which is flat and configured to engage said plate of the link of the chain, and said chain-engagement surface portion is inclined with respect to said longitudinal axis (X) by a fourth angle greater than 90°, said fourth angle being measured in a longitudinal section plane of the pin that contains said longitudinal axis (X) and said transversal direction (Y), wherein said first face comprises an anti-rotation abutment surface portion and said chain-engagement surface portion and said anti-rotation abutment surface portion are symmetrically arranged on opposite sides with respect to said mounting portion.

17. A pin for a crown of a bicycle crankset, the pin comprising:
a mounting portion extending along a longitudinal axis (X) of the pin and configured to be fixed to said crown, said mounting portion having a first dimension along a transversal direction (Y) perpendicular to said longitudinal axis (X);
a chain engaging portion associated with said mounting portion and having a second dimension greater than said first dimension along said transversal direction
wherein:
said chain engaging portion has a first face facing towards said mounting portion and configured to engage a plate of a link of a bicycle chain, and a second face facing opposite to said mounting portion;
said second face has two first surface portions arranged on opposite sides with respect to said second surface portion and inclined with respect to said longitudinal axis (X) by a first angle smaller than 90°, said first angle being measured in a longitudinal section plane of the pin that contains said longitudinal axis (X) and is perpendicular to said transversal direction (Y), and a second surface portion lying on a plane substantially perpendicular to said longitudinal axis (X); and,
said second face has at least one third surface portion that comprises two third surface portions arranged on opposite sides with respect to said second surface portion and between said two first surface portions.

18. A pin for a crown of a bicycle crankset, the pin comprising:
a mounting portion extending along a longitudinal axis (X) of the pin and configured to be fixed to said crown, said mounting portion having a first dimension along a transversal direction (Y) perpendicular to said longitudinal axis (X);
a chain engaging portion associated with said mounting portion and having a second dimension greater than said first dimension along said transversal direction (Y);
wherein said chain engaging portion comprises a first face facing towards said mounting portion and configured to engage a plate of a link of a bicycle chain, and a second face facing opposite to said mounting portion;
said first face comprising:
an anti-rotation abutment surface portion configured to cooperate with a matching anti-rotation abutment surface portion formed on said crown when said mounting portion is fixed to said crown, said anti-rotation abutment surface portion is flat and is inclined with respect to said longitudinal axis (X) by a third angle greater than 90°, said third angle being measured in a longitudinal section place of the pin that contains said longitudinal axis (X) and said transversal direction (Y);

a chain-engagement surface portion inclined with respect to said longitudinal axis (X) by a fourth angle measured in a longitudinal section place of the pin that contains said longitudinal axis (X) and said transversal direction (Y), said fourth angle has a size equal to that of said third angle;

said second face comprises at least one first surface portion inclined with respect to said longitudinal axis (X) by a first angle smaller than 90°, said first angle being measured in a longitudinal section plane of the pin that contains said longitudinal axis (X) and is perpendicular to said transversal direction (Y).

19. A pin for a crown of a bicycle crankset, the pin comprising:
    a mounting portion extending along a longitudinal axis (X) of the pin and configured to be fixed to said crown, said mounting portion having a first dimension along a transversal direction (Y) perpendicular to said longitudinal axis (X);
    a chain engaging portion associated with said mounting portion and having a second dimension greater than said first dimension along said transversal direction (Y);
    wherein said chain engaging portion comprises a first face facing towards said mounting portion and configured to engage a plate of a link of a bicycle chain, and a second face facing opposite to said mounting portion;
    said second face comprises at least one first surface portion inclined with respect to said longitudinal axis (X) by a first angle smaller than 90°, said first angle being measured in a longitudinal section plane of the pin that contains said longitudinal axis (X) and is perpendicular to said transversal direction (Y), and
    said second face comprises at least one third surface portion inclined with respect to said longitudinal axis (X) by a second angle that is different than the first angle and is smaller than 90°, said second angle being measured in a longitudinal section plane of the pin that contains said longitudinal axis (X) and said transversal direction (Y).

* * * * *